United States Patent
Di Iorio et al.

(10) Patent No.: US 10,991,956 B2
(45) Date of Patent: Apr. 27, 2021

(54) WATER ELECTROLYSIS REACTOR (SOEC) OR FUEL CELL (SOFC) WITH AN INCREASED RATE OF WATER VAPOUR USE OR FUEL USE, RESPECTIVELY

(71) Applicant: COMMISSARIAT A L'ENERGIE ATOMIQUE ET AUX ENERGIES ALTERNATIVES, Paris (FR)

(72) Inventors: Stephane Di Iorio, Lans en Vercors (FR); Guilhem Roux, Saint-Egreve (FR); Bruno Oresic, Tullins (FR); Magali Reytier, Villard de Lans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 244 days.

(21) Appl. No.: 16/335,546

(22) PCT Filed: Sep. 20, 2017

(86) PCT No.: PCT/EP2017/073839
§ 371 (c)(1),
(2) Date: Mar. 21, 2019

(87) PCT Pub. No.: WO2018/055011
PCT Pub. Date: Mar. 29, 2018

(65) Prior Publication Data
US 2019/0348691 A1    Nov. 14, 2019

(30) Foreign Application Priority Data

Sep. 22, 2016  (FR) ..................... 16 58906

(51) Int. Cl.
*H01M 8/0273*  (2016.01)
*H01M 8/1231*  (2016.01)
(Continued)

(52) U.S. Cl.
CPC ............. *H01M 8/0273* (2013.01); *C25B 1/04* (2013.01); *C25B 9/65* (2021.01); *C25B 9/70* (2021.01);
(Continued)

(58) Field of Classification Search
None
See application file for complete search history.

(56) References Cited

U.S. PATENT DOCUMENTS

2003/0104262 A1  6/2003  Kuroki et al.
2005/0191539 A1  9/2005  Yoshioka et al.
(Continued)

FOREIGN PATENT DOCUMENTS

EP    1 296 394 A1    3/2003
EP    1 729 361 A2    12/2006
(Continued)

OTHER PUBLICATIONS

Japanese Office Action dated Jun. 29, 2020 in Patent Application No. 2019-515580 (with English translation), 12 pages.
(Continued)

*Primary Examiner* — Wojciech Haske
(74) *Attorney, Agent, or Firm* — Oblon, McClelland, Maier & Neustadt, L.L.P.

(57) ABSTRACT

The invention relates to arranging a new seal within a porous substrate which forms the contact element of each hydrogen circulating electrode, such as the cathode for an SOEC reactor and the anode for an SOFC fuel cell, and in the periphery of the electrode beyond the ducts for supplying and recovering gases, in order to force the gases to circulate into the only useful zone of the cell which corresponds to the electrochemically active surface of the electrode. Thus, all of the gases supplied can be converted.

22 Claims, 7 Drawing Sheets

Figure 1:
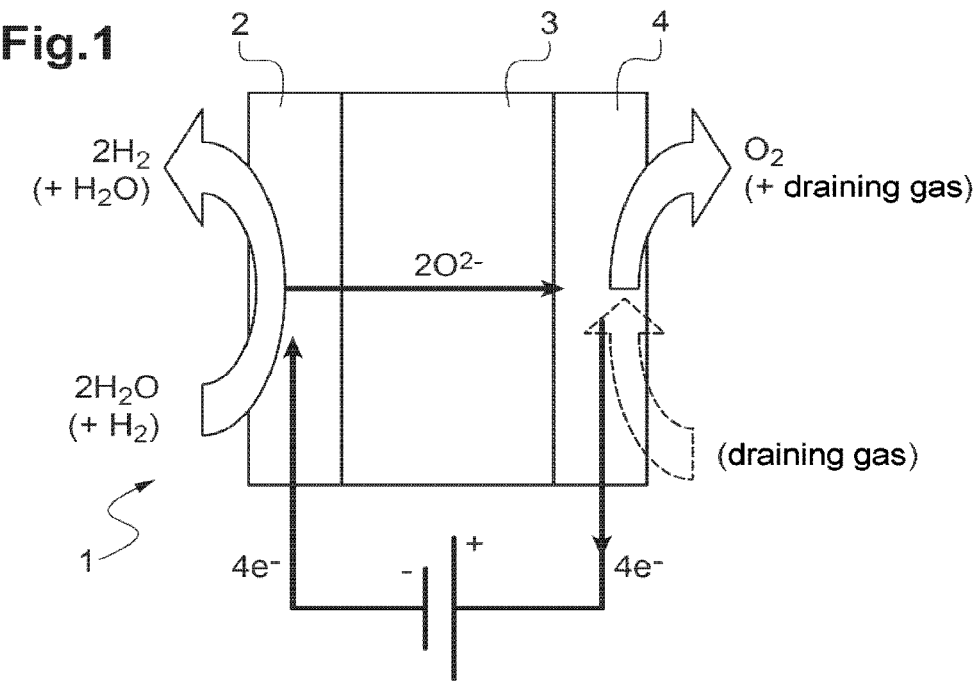

(51) Int. Cl.
  *H01M 8/2457* (2016.01)
  *C25B 15/08* (2006.01)
  *H01M 8/1213* (2016.01)
  *H01M 8/2425* (2016.01)
  *C25B 1/04* (2021.01)
  *C25B 9/65* (2021.01)
  *C25B 9/70* (2021.01)
  *C25B 9/73* (2021.01)
  *H01M 8/124* (2016.01)

(52) U.S. Cl.
  CPC .......... *C25B 9/73* (2021.01); *C25B 15/08* (2013.01); *H01M 8/1213* (2013.01); *H01M 8/1231* (2016.02); *H01M 8/2425* (2013.01); *H01M 8/2457* (2016.02); *H01M 2008/1293* (2013.01)

(56) References Cited

U.S. PATENT DOCUMENTS

2006/0275650 A1  12/2006  Yamada et al.
2016/0285113 A1  9/2016  Di Iorio et al.
2017/0362724 A1* 12/2017  Planque ............... H01M 8/021

FOREIGN PATENT DOCUMENTS

FR    3 014 246 A1   6/2015
FR    3 014 246 B1   1/2016
JP    2003-17092 A   1/2003
JP    2005-243442 A  9/2005
JP    2016-81813 A   5/2016

OTHER PUBLICATIONS

International Search Report dated Oct. 26, 2017 in PCT/EP2017/073839 filed on Sep. 20, 2017.
French Preliminary Search Report dated Feb. 8, 2017 in FR1658906 filed on Sep. 22, 2016.

* cited by examiner

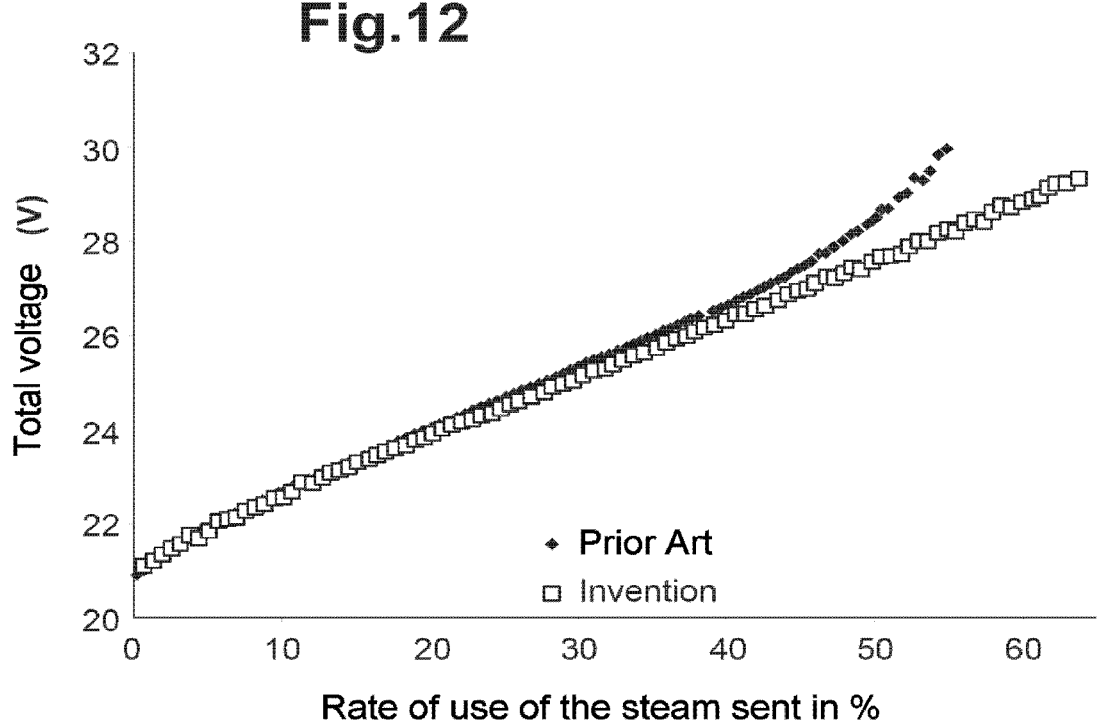
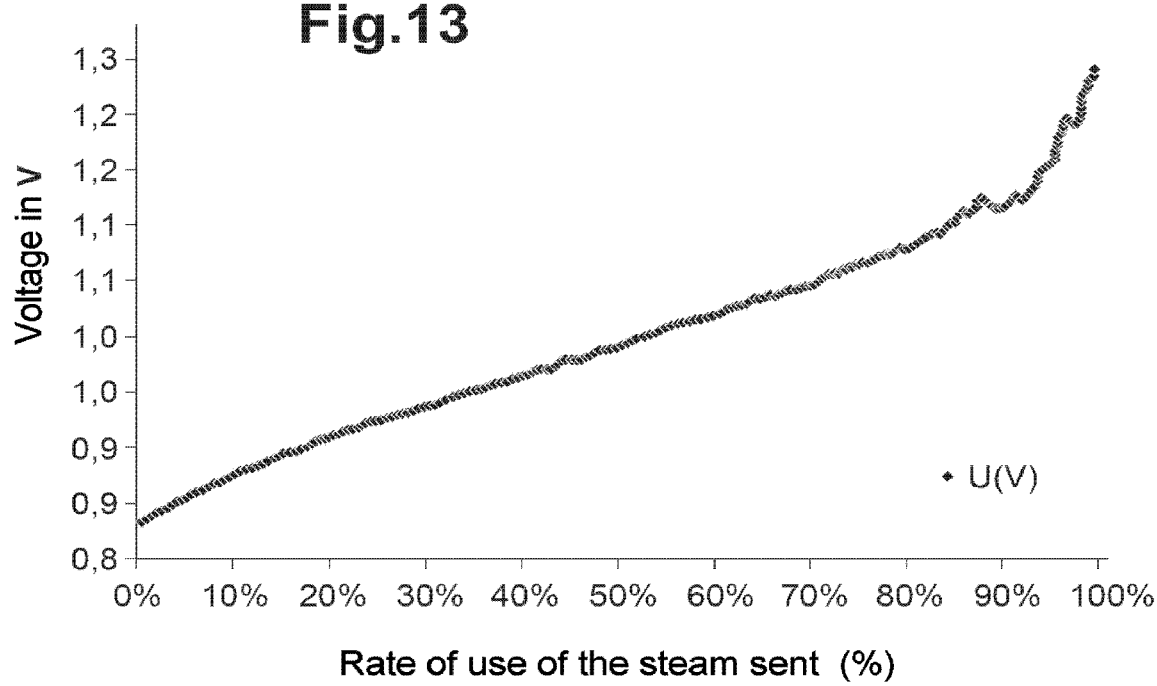

WATER ELECTROLYSIS REACTOR (SOEC) OR FUEL CELL (SOFC) WITH AN INCREASED RATE OF WATER VAPOUR USE OR FUEL USE, RESPECTIVELY

TECHNICAL FIELD

The present invention relates to the field of solid oxide fuel cells (SOFCs) and that of high-temperature electrolysis of water (HTE, acronym for "high-temperature electrolysis" or else HTSE, acronym for "high-temperature steam electrolysis") or of co-electrolysis of steam and carbon dioxide $CO_2$, also using solid oxides (SOEC, acronym for "solid oxide electrolysis cell").

The invention relates more particularly to a new design for the distribution of gases within a high-temperature water electrolysis or co-electrolysis (HTE) reactor of SOEC type, or a fuel cell of SOFC type, containing a stack of individual electrochemical cells, which makes it possible to attain high rates of use respectively of steam $H_2O$ or of fuel.

Although it is described mainly with reference to the application of high-temperature water electrolysis, the invention also applies to an SOFC fuel cell supplied with hydrogen $H_2$ and/or with methane $CH_4$ as fuel, and with air or oxygen $O_2$ or air as oxidizer.

PRIOR ART

The electrolysis of water is an electrolytic reaction that decomposes water into gaseous dioxygen and dihydrogen by means of an electrical current, according to the reaction:

$$H_2O \rightarrow H_2 + \tfrac{1}{2}O_2.$$

It is advantageous to carry out the electrolysis of water at high temperature, typically between 600 and 1000° C., as some of the energy required for the reaction can be supplied by heat, which is less expensive than electricity, and activation of the reaction is more efficient at high temperature and does not require a catalyst. It is known to use an SOEC (acronym of "solid oxide electrolysis cell") electrolyzer to implement high-temperature electrolysis, said electrolyzer consisting of a stack of individual units that each comprise a solid oxide electrolysis cell, consisting of three anode/electrolyte/cathode layers superposed on one another, and of interconnecting plates made of metal alloys, also referred to as bipolar plates or interconnectors. The function of the interconnectors is both to let electric current pass and gases flow in the vicinity of each cell (injected steam and extracted hydrogen and oxygen in an HTE electrolyzer; injected air and hydrogen and extracted water in an SOFC fuel cell) and to separate the anode and cathode compartments, which are the gas-flow compartments on the anode side and the cathode side of the cells, respectively. To carry out high-temperature electrolysis (HTE) of steam, steam ($H_2O$) is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and discharged at the outlet of the hydrogen compartment. The $O^{2-}$ oxygen ions migrate through the electrolyte and recombine into dioxygen at the interface between the electrolyte and the oxygen electrode (anode).

As shown schematically in FIG. 1, each individual electrolysis cell 1 is formed from a cathode 2 and an anode 4, placed on either side of a solid electrolyte 3, generally in the form of a membrane. The two electrodes (cathode and anode) 2, 4 are electron conductors, made of porous material, and the electrolyte 3 is gastight, an electron insulator and an ion conductor. The electrolyte may in particular be an anion conductor, more precisely an anion conductor of the $O^{2-}$ ions and the electrolyzer is then referred to as an anion electrolyzer.

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2, 4 is the site of migration of the $O^{2-}$ ions under the effect of the electrical field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas, such as air, may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

A high-temperature water electrolyzer (HTE) thus comprises at least one, generally a plurality of, electrolysis cells stacked on top of one another, each individual cell being formed of an electrolyte, of a cathode and of an anode, the electrolyte being inserted between the anode and the cathode.

The fluidic and electrical interconnection devices, which are in electrical contact with one or more electrodes, generally provide the functions of introducing and collecting electrical current and delimit one or more gas flow compartments.

Thus, a "cathode" compartment has the role of distributing the electrical current and steam and also of recovering the hydrogen at the cathode in contact.

An "anode" compartment has the role of distributing the electrical current and also of recovering the oxygen produced at the anode in contact, optionally with the help of a draining gas.

Figure 2:
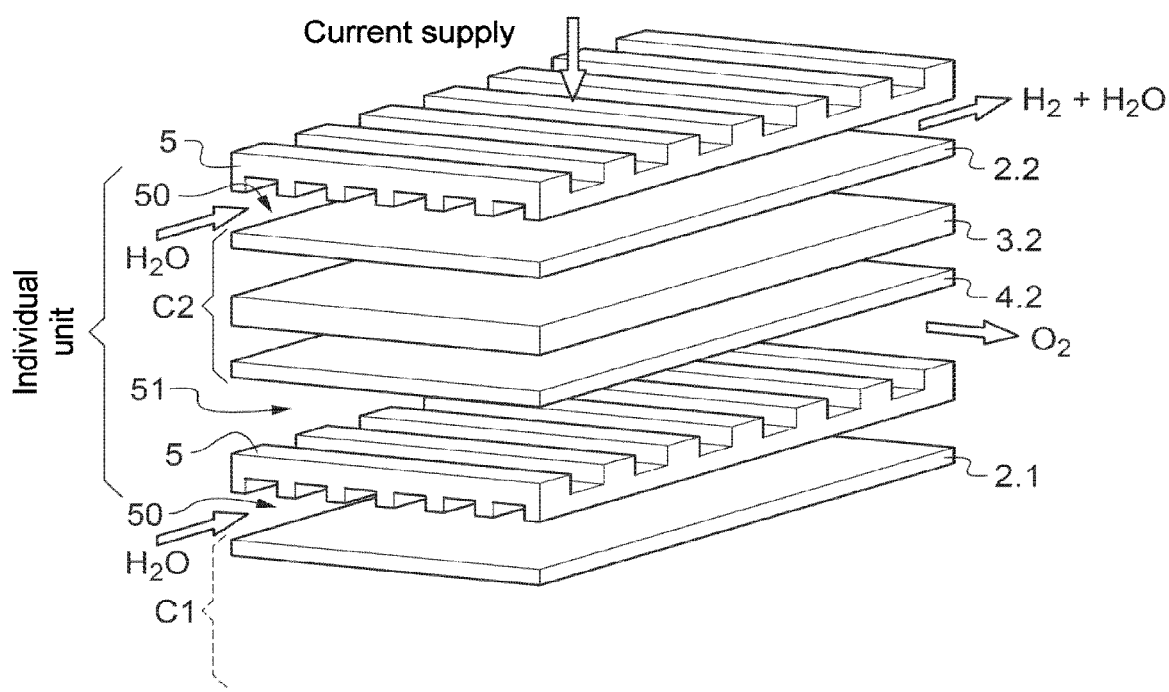

FIG. 2 represents an exploded view of individual units of a high-temperature steam electrolyzer according to the prior art. This HTE electrolyzer comprises a plurality of individual electrolysis cells C1, C2, . . . , of solid oxide (SOEC) type, stacked alternately with interconnectors 5. Each cell C1, C2, . . . , consists of a cathode 2.1, 2.2, . . . , and an anode 4.1, 4.2, . . . between which an electrolyte 3.1, 3.2, . . . is arranged. The assembly of the electrolysis cells is supplied in series by the electrical current and in parallel by the gases.

The interconnector 5 is a component made of metal alloy, which provides the separation between the cathode compartment 50 and anode compartment 51, which are defined by the volumes between the interconnector 5 and the adjacent cathode 2.1 and between the interconnector 5 and the adjacent anode 4.2, respectively. It also provides distribution of the gases to the cells. Injection of steam into each individual unit takes place in the cathode compartment 50. Collection of the hydrogen produced and of the residual steam at the cathode 2.1, 2.2, . . . takes place in the cathode compartment 50 downstream of the cell C1, C2, . . . after dissociation of the steam by the latter. Collection of the oxygen produced at the anode 4.2 takes place in the anode compartment 51 downstream of the cell C1, C2, . . . after dissociation of the steam by the latter.

The interconnector 5 provides the passage of the current between the cells C1 and C2 by contact, preferably direct contact, with the adjacent electrodes, that is to say between the anode 4.2 and the cathode 2.1.

In a solid oxide fuel cell SOFC, according to the prior art, the cells C1, C2, . . . and interconnectors 5 used are the same components, but the operation is the reverse of that of an HTE electrolyzer such as has just been explained, with a reversed current direction, with air or oxygen $O_2$ which supplies what have become cathode compartments and hydrogen and/or methane $CH_4$ as fuel which supplies what have become anode compartments.

Satisfactory operation of an HTE electrolyzer requires, inter alia, the following essential functions:

A/ good electrical insulation between two adjacent interconnectors in the stack, otherwise the individual electrolysis cell inserted between the two interconnectors will be short-circuited, B/ good leaktightness between the two separate compartments, i.e. anode and cathode compartments, otherwise the gases produced will recombine, resulting in a drop in yield and in particular in the appearance of hot spots which damage the electrolyzer, C/ good distribution of the gases both at the inlet and on recovery of the gases produced, otherwise there will be a loss of yield, nonuniformity of pressure and nonuniformity of temperature within the various individual cells, or even unacceptable deterioration of the cells.

The high temperatures considerably complicate the fulfillment of the three abovementioned essential functions A/ to C/. In addition, the fragility of the solid oxide cells necessitates certain restrictive design measures so as to guarantee the mechanical integrity thereof.

Various designs already exist for simultaneously achieving the three essential functions A/ to C/.

Figure 3A:
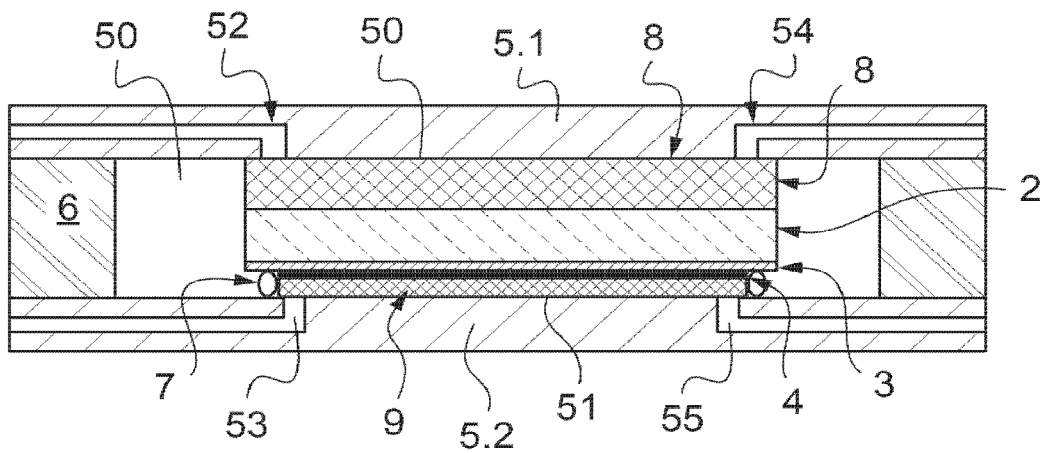
Figure 3B:
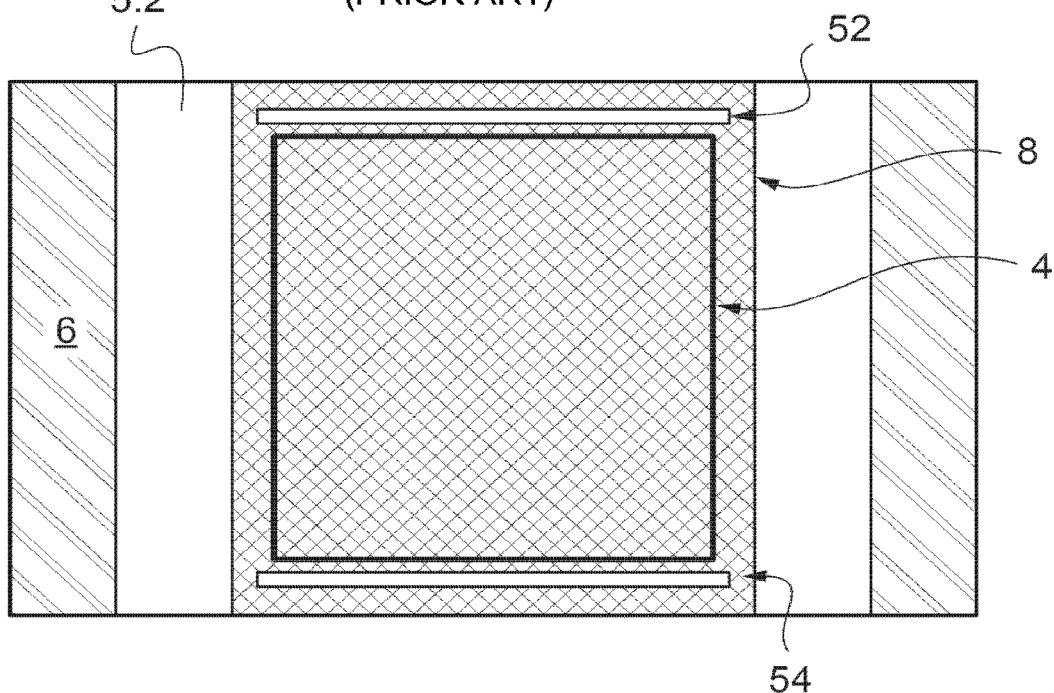

Indeed, usually, these functions within an EHT electrolyzer are achieved according to the configuration shown schematically in FIGS. 3A and 3B relative to an individual unit of the stack forming the electrolyzer. A cathode-supported electrolysis cell C is inserted between two consecutive interconnectors 5.1, 5.2 in the stack. These interconnectors 5.1, 5.2 are usually produced by mechanical machining of thick metal plates or by the use of thin metal sheets, typically from 0.1 to 2 mm thick, stamped then assembled together by laser welding.

The top interconnector 5.1 is pierced with a conduit for supplying steam 52, which opens at the periphery of one side of the cathode 2, and with a conduit for recovering the hydrogen produced 54, which opens at the periphery of the cell on the side of the cathode 2 opposite the side on which the supply conduit opens, so as to distribute the steam supplied and the hydrogen produced, in the cathode compartment 50.

The bottom interconnector 5.2 is itself pierced with a conduit for supplying draining gas 53, such as air, on the cell on one side of the anode 4, and with a conduit for recovering the oxygen produced 55, which opens at the periphery of the cell on the side of the anode 4 opposite the side on which the supply conduit opens, so as to distribute the draining gas and the oxygen produced in the anode compartment 51.

A first seal 6 is arranged at the periphery of the individual cell and bears both against the top interconnector 51 and against the bottom interconnector. The role of this seal 6 is to provide leaktightness of the cathode compartment with respect to the outside.

A second seal 7 is arranged at the periphery of the anode 4 of the individual cell and bears both against the bottom interconnector 5.2 and against the electrolyte 3 of the cell. This second seal 7 makes it possible to provide leaktightness between cathode 50 and anode 51 compartments, the oxygen produced $O_2$ and optionally the draining gas circulating within the latter.

Given the high operating temperature ranges of HTE electrolyzers and SOFC fuel cells, typically 600° C. to 1000° C., the seals are conventionally produced based on glass or glass-ceramic. A glass seal is in the pasty state at the operating temperature. At the design stage, it is necessary to take care not to expel the glass under the effect of a pressure difference applied to the seal. A glass-ceramic seal itself undergoes a thermal cycle in situ with the aim of causing it to crystallize and hence of limiting the flow thereof by endowing it with internal rigid elements at the operating temperature. As with the glass seal, it is necessary to take care not to expel the glass-ceramic before it is rigidified. In the configuration shown schematically in FIG. 3, this constraint is taken into account by the density of the surfaces on either side of a seal: the seal rests on a support that is intrinsically leaktight and therefore nonporous. Moreover, high surface tension between the seal and its support makes it possible to prevent the glass from flowing up to a certain pressure differential on either side of a seal. In order to promote obtaining good mechanical strength of the seal, it is necessary to reduce the height of the seal as much as possible and to increase the surface area of the zones in contact with the glass. The reduction in height of the glass or glass-ceramic seals is obtained by clamping the stack of the reactor and by a precise control of the initial chain of dimensions combined with taking into account the respective compressions of each component.

A first electrical contact element 8 is in mechanical contact on the one hand with the interconnector 5.1 and on the other hand with the cathode 2.

A second electrical contact element 9 is in mechanical contact on the one hand with the anode 4 and on the other hand with the bottom interconnector 5.2.

Usually, the contact element 8 is a metal screen made of nickel which has the advantages of being an effective solution for ensuring the electrical continuity between the interconnector and cathode and the flow of the gases, and is relatively inexpensive. The element 9 cannot be a nickel screen since the atmosphere of this chamber is oxidizing and the nickel would be converted very rapidly into nickel oxide which is not conductive. One possible solution is to machine the interconnector 5.2 in order to create channels for distributing the gas between supply conduit 52 and recovery conduit 54.

In the configuration illustrated in FIGS. 3A and 3B, the contact screen 8, the dense electrolyte 3 and the cathode 2 have substantially the same surface area which is greater than that of the anode 4 and of the contact element 9. This reduced surface area of the anode 4, in particular in the case of a "cathode-supported" cell, is furthermore benefited from for the positioning of the second seal 7 between the bottom interconnector 5.2 and the electrolyte 3, since these components intrinsically have dense planes advantageous for creating good leaktightness. Therefore also, the working electrochemical surface area of the cell is limited to that of the anode 4.

This configuration, with contact screen 8 and first seal 6 between cathode compartment 50 and outside of the stack, has several drawbacks.

Figure 4A:
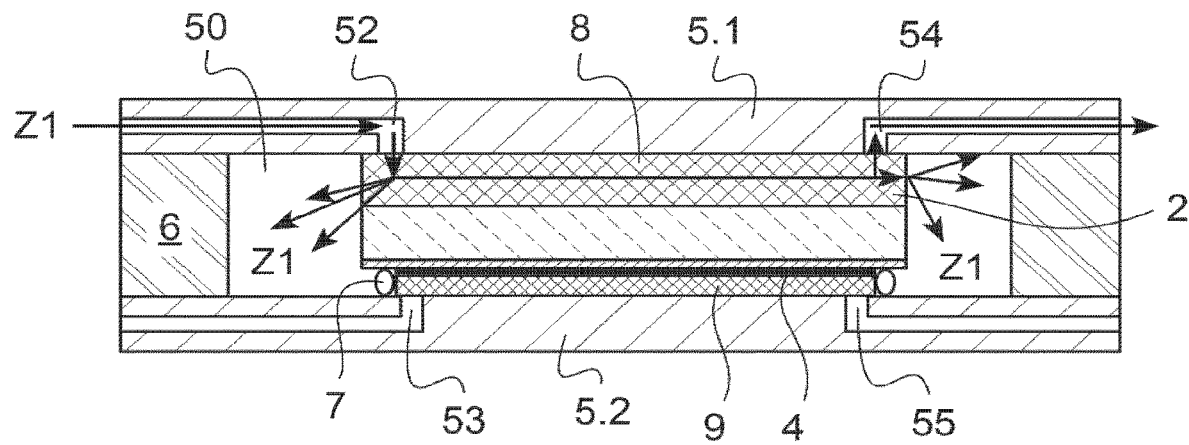
Figure 4B:
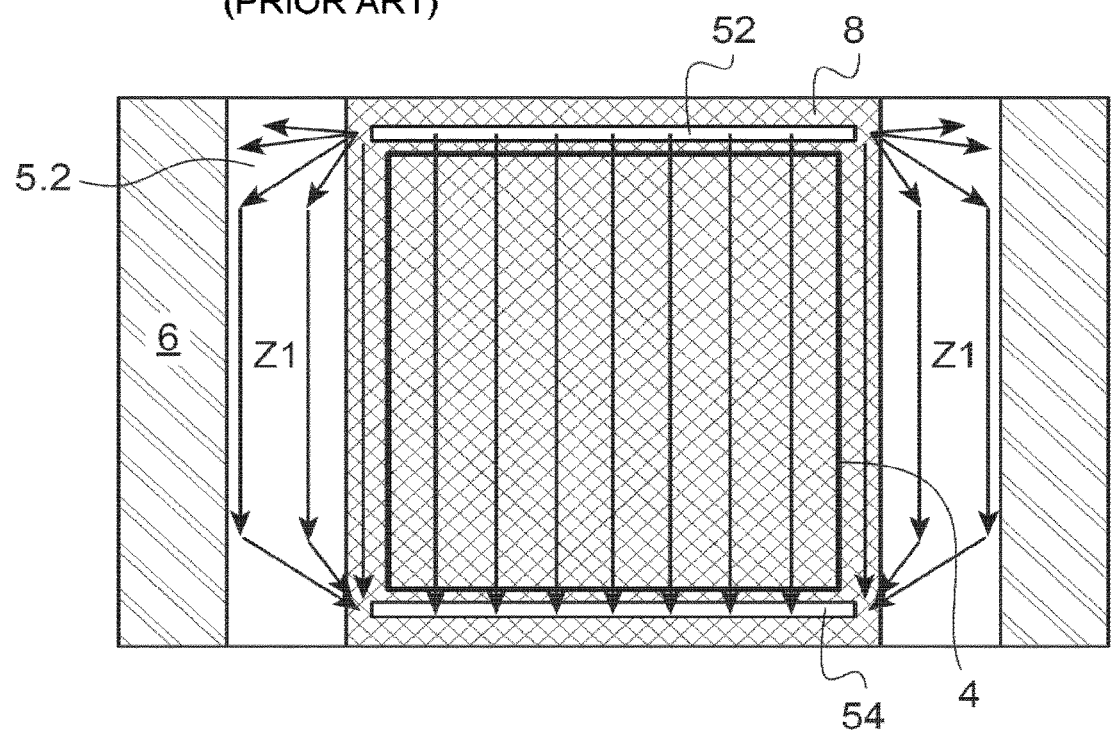

Firstly, the inventors have been able to observe that some of the steam which is intended to supply the cathode is in fact not used, i.e. is not converted into hydrogen. Specifically, as illustrated in FIGS. 4A and 4B, some of the steam supplied in the conduit 52 is not distributed to the cathode 2 but flows in the non-working and/or non-electrochemically active zones Z1 which are located at the periphery of the cell, i.e. in the free space delimited between the periphery of the cell and the seal 6. In other words, the maximum rate of use of the steam supplied in the conduit 52 will never be able to be 100%.

Figure 5:
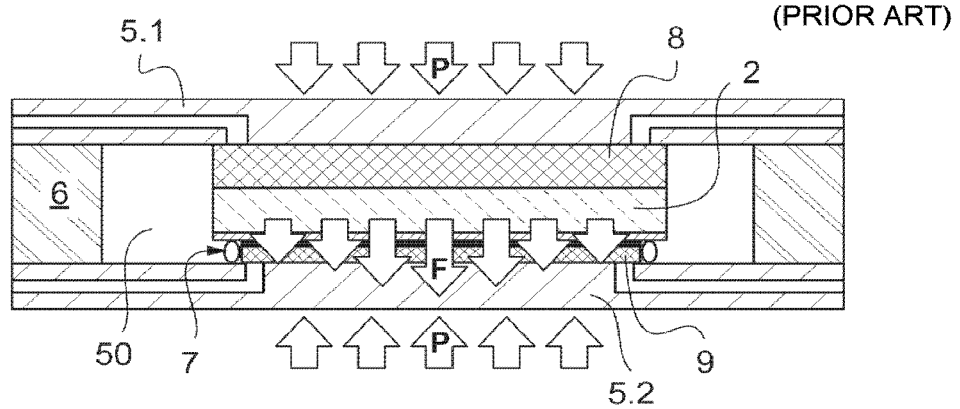

Next, the arrangement of the second seal 7 supported by the dense electrolyte 3 at the periphery of the anode 4 places the cell C in an unstable position. This creates flexural stresses which give rise to a tensioning of certain parts of the cell during the clamping of the stack of the electrolyzer. Specifically, the second seal 7 becomes increasingly rigid over time, and the stresses applied to the stack result in tensile stresses due to this flexion which are damaging for each cell. The stresses of the clamping of the stack are represented in FIG. 5 in the form of arrows P whilst the harmful flexural displacements of the cell are shown in the form of arrows F of different size.

The drawbacks explained above have repercussions for all the individual units of the stack.

There is therefore a need to find a novel configuration of an (HTE) electrolyzer of SOEC type or of a fuel cell of SOFC type with a stack, which makes it possible to achieve the aforementioned functions A/ to C/, in particular by avoiding the drawbacks of the configuration shown schematically in FIGS. 3A and 3B, and therefore by increasing the maximum degree of conversion of the injected gas (steam in electrolysis mode, fuel in fuel cell mode) and by minimizing the mechanical stresses generated by flexion, which are harmful to the cells, while guaranteeing a satisfactory electrical continuity in the stack.

One aim of the invention is to at least partially meet this need.

Another aim of the invention is to provide a novel configuration of an (HTE) electrolyzer of SOEC type or of a fuel cell of SOFC type which at least partly meets this need and which makes it possible to modify a minimum number of parts for producing the stack compared to those of the prior art.

SUMMARY OF THE INVENTION

To this end, the invention relates, in one of its aspects, and according to a first alternative, to a device, intended to form an individual unit of an electrolysis or co-electrolysis reactor of SOEC type, comprising:

a solid oxide individual electrolysis cell formed of a cathode, of an anode and of an electrolyte inserted between the cathode and the anode, a first and a second electrical and fluid interconnector, each consisting of a component made of electron-conducting and gastight material, the first and second interconnectors being arranged on either side of the individual cell; the first interconnector being pierced with a conduit for supplying steam, which opens at the periphery of one side of the cathode, and with a conduit for recovering the hydrogen produced, which opens at the periphery of the cell on the side of the cathode opposite the side on which the supply conduit opens, so as to distribute the steam supplied and the hydrogen produced, in a compartment; the second interconnector being pierced with a conduit for recovering the oxygen produced, which opens at the periphery of the cell on the side of the anode so as to distribute the oxygen produced to the recovery conduit in a compartment;

a first electrical contact element, different from the interconnectors, which is in mechanical contact on the one hand with the first interconnector and on the other hand with the cathode; the first electrical contact element being a porous substrate.

According to the invention, the device comprises:

a first seal arranged at the periphery of the individual cell and bearing both against the first interconnector and against the second interconnector;

a second seal arranged at the periphery of the anode of the individual cell and bearing both against the second interconnector and against the electrolyte.

a third seal, inserted into the porous substrate of the first contact element, the seal bearing against the first interconnector and the cathode by being arranged at the periphery of the conduits for supplying steam and for recovering the hydrogen produced, respectively, thus delimiting the compartment for distributing the steam supplied and the hydrogen produced.

According to one feature of the invention, the second interconnector may be pierced with a conduit for supplying draining gas, such as air, on the cell on the side of the anode opposite to the side on which the conduit for recovering $O_2$ opens, so as to distribute respectively the draining gas supplied and the oxygen produced, from the supply conduit to the recovery conduit.

According to one advantageous variant, the device comprises a second electrical contact element, which is in mechanical contact on the one hand with the anode and on the other hand with the second interconnector.

Another subject of the invention, according to a second alternative, is a device, intended to form an individual unit of a fuel cell of SOFC type, comprising:

a solid oxide individual electrochemical cell formed of an anode, of a cathode and of an electrolyte inserted between the cathode and the anode, a first and a second electrical and fluid interconnector, each consisting of a component made of electron-conducting and gastight material, the first and second interconnectors being arranged on either side of the individual cell; the first interconnector being pierced with a conduit for supplying fuel, which opens at the periphery of one side of the anode, and with a conduit for recovering the water produced, which opens at the periphery of the cell on the side of the anode opposite the side on which the supply conduit opens, so as to distribute the fuel supplied and the water produced, respectively, in a compartment; the second interconnector being pierced with a conduit for supplying air or oxygen, which opens at the periphery of the cell on one side of the cathode and with a conduit for recovering the surplus air or oxygen, which opens at the periphery of the cell on the side of the cathode opposite the side on which the supply conduit opens, so as to distribute the air or oxygen to the recovery conduit in a compartment;

a first electrical contact, different from the interconnectors, which is in mechanical contact on the one hand with the first interconnector and on the other hand with the anode; the first electrical contact element being a porous substrate.

According to the invention, the device comprises:

a first seal arranged at the periphery of the individual cell and bearing both against the first interconnector and against the second interconnector;

a second seal arranged at the periphery of the cathode of the individual cell and bearing both against the second interconnector and against the electrolyte;

a third seal, inserted into the porous substrate of the first contact element, the seal bearing against the first interconnector and the anode by being arranged at the periphery of the conduits for supplying fuel and for recovering the water produced, respectively, thus delimiting the compartment for distributing the fuel supplied and the water produced.

The expression "arranged at the periphery of the conduits" is understood here and within the context of the invention to mean arranged at the periphery of the electrode beyond ducts for supplying and recovering the gases, the electrode being the cathode for a (co-)electrolysis reactor and the anode for an SOFC fuel cell.

According to an advantageous embodiment variant, the device comprises a second electrical contact element, which is in mechanical contact on the one hand with the cathode and on the other hand with the second interconnector.

Thus, the invention essentially consists in arranging a new seal, within a porous substrate which forms the contact element of each hydrogen $H_2$ flow electrode (cathode for an SOEC reactor, anode for a fuel cell), and at the periphery of this electrode beyond the conduits for supplying the gas injected and for recovering the gases, in order to force the circulation of said gases into the sole working zone of the cell which corresponds to the electrochemically active surface of the $H_2$ electrode. Thus, all of the gases injected ($H_2O$, $H_2$, $CO_2$, CO, $CH_4$, etc.), supplying either an electrolysis or co-electrolysis reactor, or an SOFC fuel cell, may be converted.

Hence, the maximum degree of conversion of the injected gases is increased, and may reach 100%.

According to one feature of the invention, the first and second seals may each be a bead based on glass and/or on glass-ceramic.

According to one advantageous embodiment of the invention, the seal arranged at the periphery of the conduits is moreover arranged substantially in a vertical line with the second seal, the first contact element being considered to be above the electrolyte, i.e. above the cathode of a (co-)electrolyzer and above an anode of an SOFC fuel cell. This arrangement limits the flexions of the cells in the stack and therefore the detrimental tensile mechanical stresses. Specifically, the porous substrate of the contact element has the same geometric surface area as the $H_2$ electrode, which makes it possible to support the cell and to distribute the stresses over the entire surface thereof. And owing to the fact that the third seal is located in line with the second seal, the cell is no longer in an unstable position, and therefore no flexion is induced over the cells.

Thus, the judiciously arranged seal according to the invention makes it possible to overcome the drawbacks of the configurations of an SOEC reactor or an SOFC fuel cell according to the prior art, by increasing the effectiveness of the distribution of the gases and by minimizing the mechanical stresses detrimental to the cells of the stack by limiting the flexions, while guaranteeing a good electrical contact between interconnector and cell.

According to one advantageous variant, the seal at the periphery of the conduits is a bead based on glass and/or on glass-ceramic inserted into the porous substrate of the first contact element. It is particularly advantageous to produce the seal according to the invention from a glass-ceramic bead. A glass-ceramic at room temperature is in the form of a paste which it is easy to cause to penetrate a porous metallic substrate such as a nickel screen. A rise in temperature of the seal to temperatures between 850 and 1000° C. will make it possible to melt the glass-ceramic which will be put in place while hot and conform to the shape of the substrate by filling the porosities, such as the meshes of the nickel screen, according to the continuous profile that it is desired to give thereto in order to obtain a leaktight seal. The temperature increase and decrease rates of the seal are preferably less than 5° C./min.

Once put in place, the seal is crystallized at the operating temperatures of the reactor or the fuel cell, typically between 600 and 850° C., and therefore prevents any passage of injected gases from the supply conduits ($H_2O$, $H_2$, $CO_2$, CO, $CH_4$, etc.) to the non-active zones of the $H_2$ electrode at the periphery of the cells and beyond the conduits for supplying and recovering gases.

One advantageous example of the composition and use of the seal is the one described in patent FR3014246 B1.

According to one distinct variant, the seal at the periphery of the conduits may consist of a bead of solder inserted into the porous substrate of the first contact element. The solder may be inserted into the porous substrate before the positioning in the stack of an SOEC reactor or SOFC fuel cell.

Advantageously, the height of the seal at the periphery of the conduits is substantially the same as that of the porous substrate of the first contact element, while guaranteeing that this seal is indeed in contact with the first interconnector and the cathode of the electrolyzer or anode of the SOFC fuel cell.

Also advantageously, the porous substrate of the first contact element is a metal screen, such as a nickel screen. A nickel screen is a contact solution that is relatively inexpensive and effective as electrical contact element and element for distributing gases. Embedding a seal made of glass or of glass-ceramic or a solder within a nickel screen is not detrimental to the effectiveness of the latter and enables it to indeed remain in contact with the interconnector and the cell throughout the operating time of the SOEC reactor or SOFC fuel cell. In particular, the glass-ceramic retains an ability to be greatly deformed over several hours so as not to hinder the possible deformations of the nickel screen which occur when setting up the electrolyzer. For longer periods, of the order of a day and a week, the glass-ceramic, although rigidified by its internal structure, retains a certain flow capacity which makes it possible to accommodate the deformation of the nickel screen.

According to one advantageous feature, the porous substrate of the first electrical contact element has a surface area substantially identical to that of the electrode with which it is in contact.

More preferably, each interconnector consists of a plate or of an assembly of flat metal sheets, and has a thickness of between 0.1 and 10 mm.

Preferably, the plates or metal sheets constituting the interconnectors are made of ferritic steel containing approximately 20% chromium, preferably made of CROFER® 22APU or F18TNb or AISI 441, or based on nickel of Inconel® 600 or Haynes® type.

Preferably, the individual electrolysis cells are of cathode-supported type. The expression "cathode-supported cell" is understood here and within the context of the invention to mean the definition already given in the field of high-temperature electrolysis HTE of water, and denoted by the acronym CSC for "cathode-supported cell", that is to say to mean a cell in which the electrolyte and the oxygen electrode (anode) are positioned on the thicker hydrogen electrode (cathode) which thus serves as support.

Another subject of the invention is an HTE electrolysis or co-electrolysis reactor, of SOEC type comprising a stack of a plurality of devices described above.

A final subject of the invention is a fuel cell of SOFC type comprising a stack of a plurality of devices described above.

The invention finally relates to a system comprising an aforementioned (co-)electrolysis reactor, that is able to operate reversibly as a fuel cell as described above and vice versa.

DETAILED DESCRIPTION

Figure 6A:
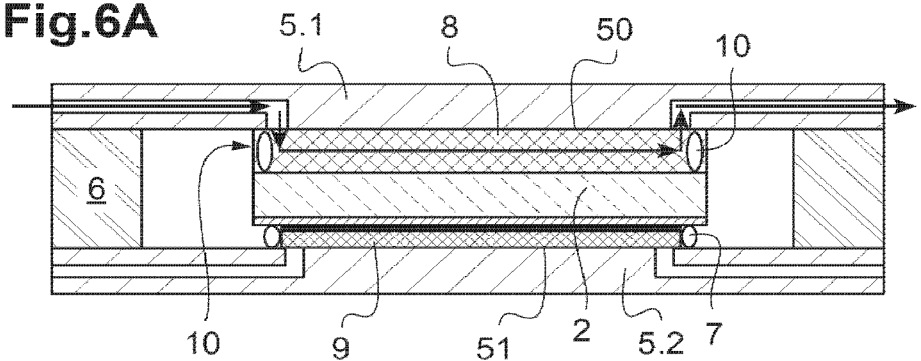
Figure 6B:
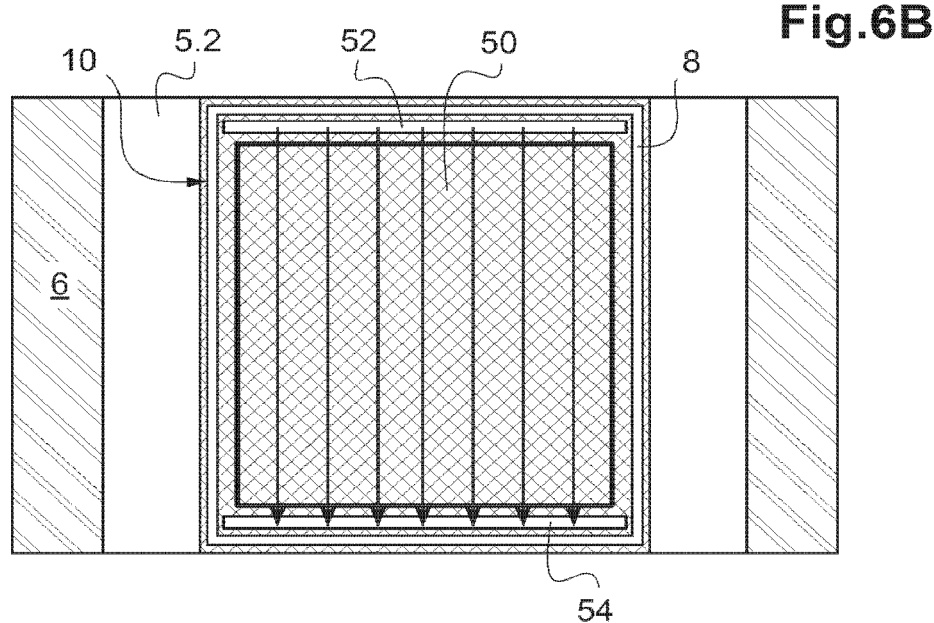
Figure 7:
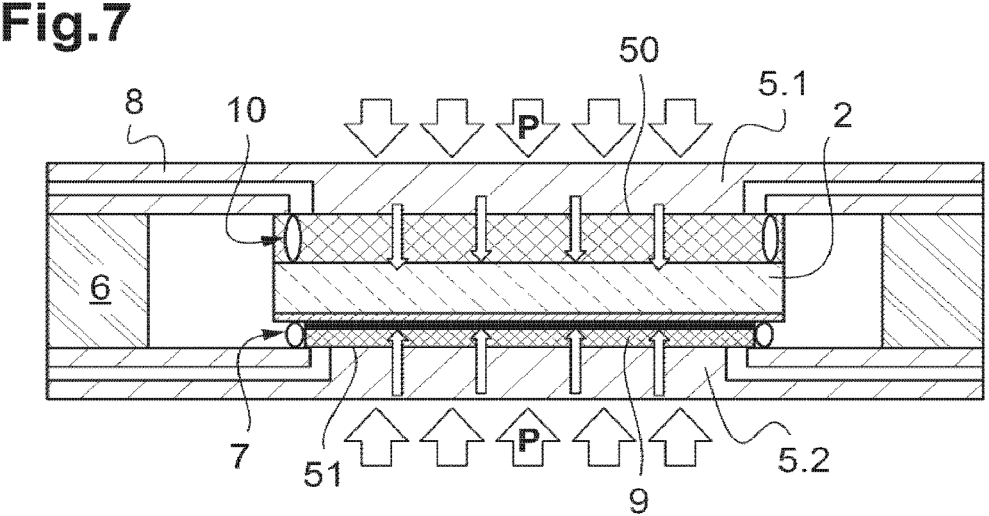
Figure 8:
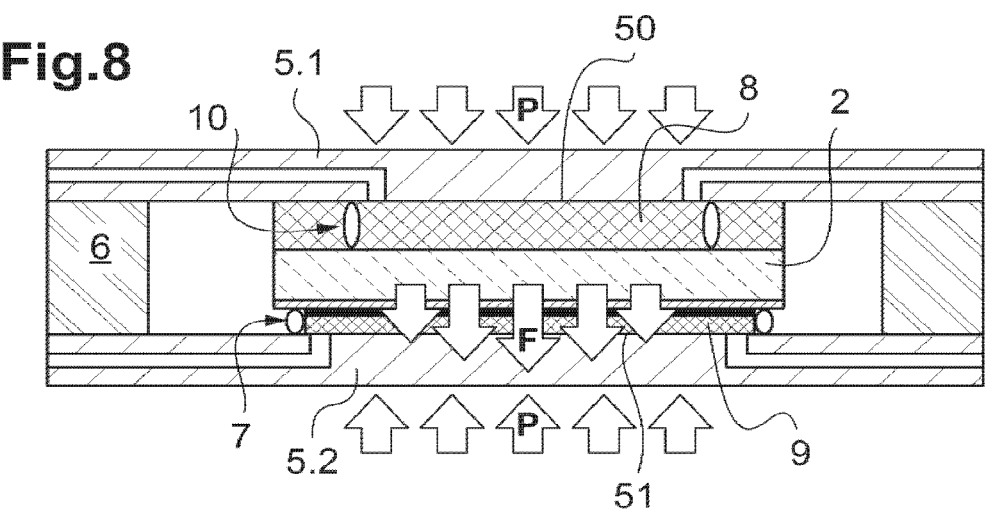
Figure 9:
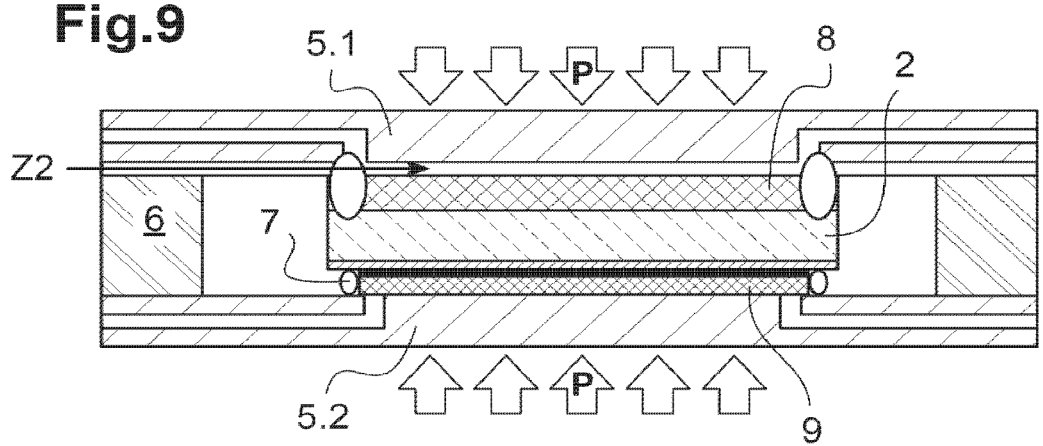
Figure 10:
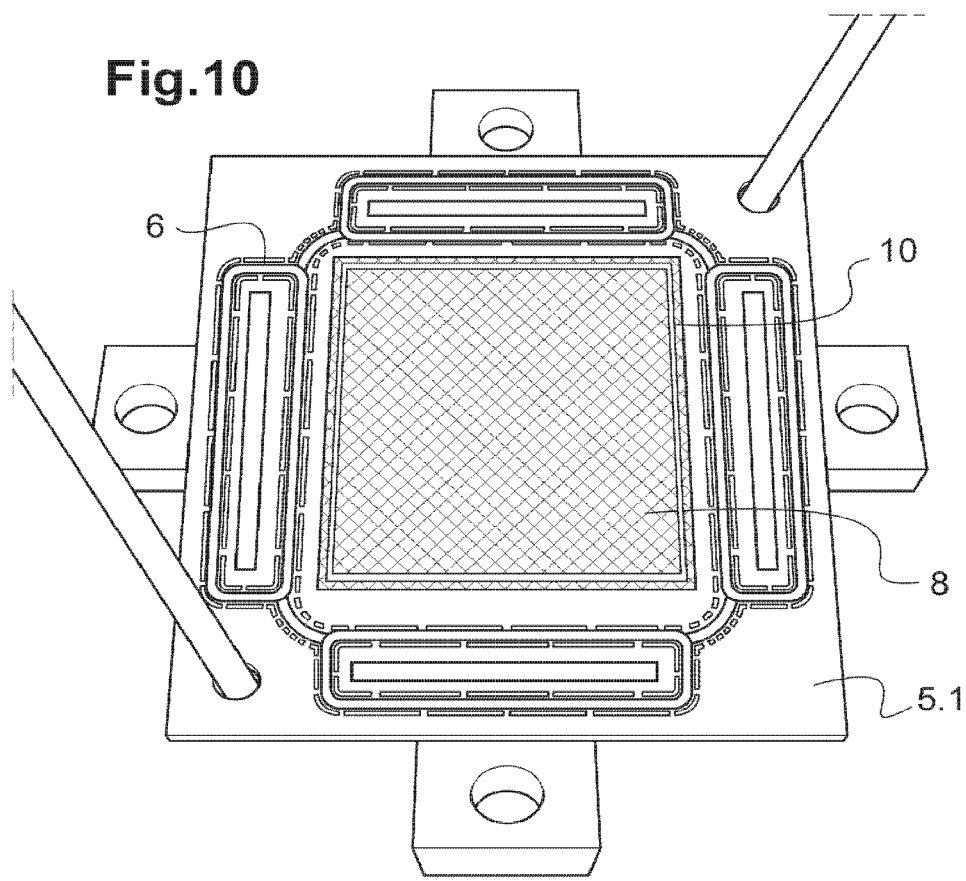
Figure 11:
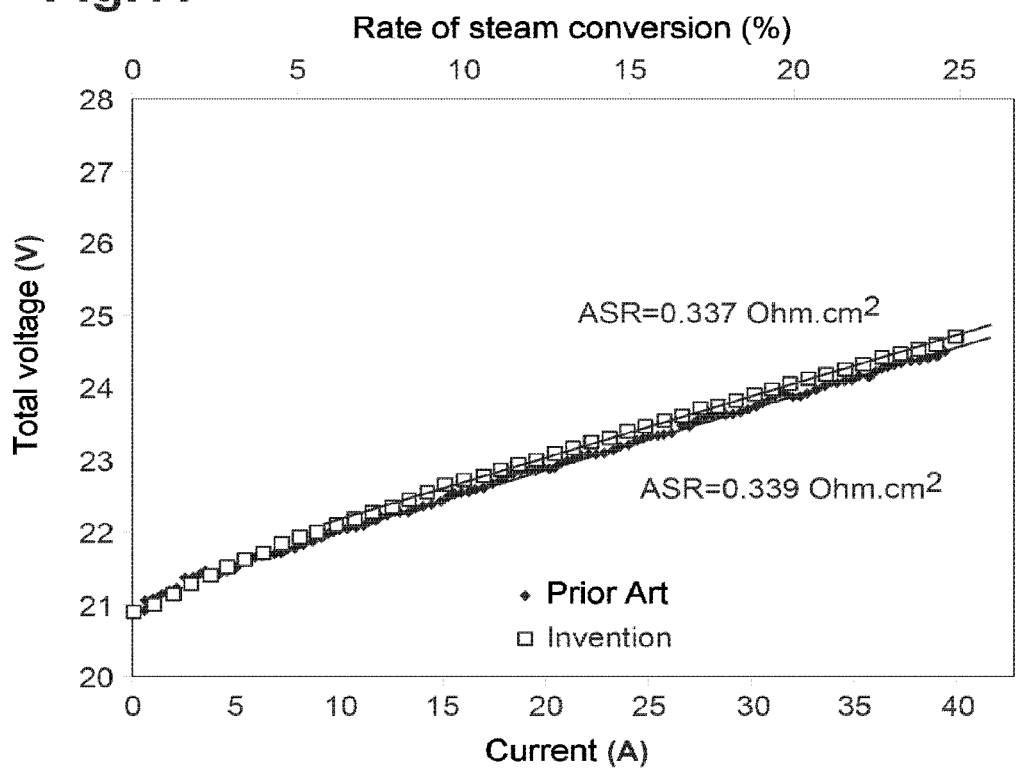

Other advantages and features of the invention will become more clearly apparent on reading the detailed description of examples of implementation of the invention, given by way of nonlimiting illustration with reference to the following figures, in which:

FIG. 1 is a schematic view showing the operating principle of a high-temperature water electrolyzer, FIG. 2 is a schematic exploded view of a part of a high-temperature steam electrolyzer (HTE) of SOEC type comprising interconnectors according to the prior art, FIGS. 3A and 3B are respectively longitudinal cross-sectional and top schematic views of anindividual unit of an HTE electrolyzer or of a fuel cell of SOFC type according to the prior art showing the configuration of the seals, electrical contacts and distribution of gases within the stack, FIGS. 4A and 4B repeat FIGS. 3A and 3B and show the circulation of the steam and of the hydrogen produced, according to the prior art, FIG. 5 is a view identical to FIG. 3A and shows the flexural stresses to which the cell is subjected, FIGS. 6A and 6B are respectively longitudinal cross-sectional and top schematic views of an individual unit of an HTE electrolyzer or of a fuel cell of SOFC type according to the prior art showing the configuration of the seals, electrical contacts and distribution of gases within the stack, these figures further showing the circulation of the steam and of the hydrogen produced, according to the prior art, FIG. 7 is a view identical to FIG. 6A and shows the absence of flexion for the cell when the seal in accordance with the invention is of suitable height and has a suitable position, FIG. 8 is a view identical to FIG. 6A and shows the displacements F of the cell when the seal in accordance with the invention is not positioned as in FIG. 7, FIG. 9 is a view identical to FIG. 6A and shows the stresses to which the cell is subjected when the seal in accordance with the invention does not have the height as in FIG. 7, FIG. 10 is a photographic reproduction, in top view, of an individual unit of an electrolyzer according to the invention showing the positioning of the seal in accordance with the invention, FIG. 11 shows curves representative of the polarization (change in voltage as a function of the current applied) of a stack of known cathode-supported electrolysis cells (CSC) having a surface area equal to 100 cm$^2$, at a temperature of 800° C., under steam $H_2O$ at the inlet, respectively with a configuration according to the prior art and a configuration according to the invention;

FIG. 12 shows curves representative of the change in voltage, during the polarization, as a function of the rate of steam use of a stack of known cathode-supported electrolysis cells (CSC) having a surface area equal to 100 cm$^2$, at a temperature of 800° C., under steam $H_2O$ at the inlet, respectively with a configuration according to the prior art and a configuration according to the invention;

FIG. 13 shows a curve representative of the change in voltage, during the polarization, as a function of the rate of steam use of a single known cathode-supported electrolysis cell (CSC) having a surface area equal to 100 cm$^2$, at a temperature of 800° C., under steam $H_2O$ at the inlet, with a configuration according to the invention.

It is specified here that, in FIGS. 1 to 2, the symbols and arrows of supply of, on the one hand, steam $H_2O$, of distribution and recovery of dihydrogen $H_2$ and of oxygen $O_2$ and of the current and, on the other hand, of distribution and recovery of oxygen $O_2$ and of the current are shown for the purposes of clarity and precision, to illustrate the operation of a steam electrolysis reactor according to the prior art and of an electrolysis reactor according to the invention.

It is also specified that, throughout the application, the terms "above", "below", "in a vertical line with", "vertical", "lower", "upper", "bottom", "top", "below" and "above" should be understood with reference to an SOEC electrolysis reactor or an SOFC fuel cell in the vertical configuration in operation, that is to say with the planes of interconnectors and electrochemical cells being horizontal, the $O_2$ electrode below the $H_2$ electrode.

It is also specified that all the electrolyzers described are of solid oxide type (SOEC, acronym of "solid oxide electrolysis cell") operating at high temperature. Thus, all the constituents (anode/electrolyte/cathode) of an electrolysis cell are ceramics. The high operating temperature of an electrolyzer (electrolysis reactor) is typically between 600° C. and 1000° C.

Typically, the characteristics of an individual SOEC electrolysis cell suitable for the invention, of the cathode-supported (CSC) type, may be those indicated as follows in table 1 below.

TABLE 1

| Electrolysis cell | Unit | Value |
| --- | --- | --- |
| Cathode 2 | | |
| Material from which it is made | | Ni-YSZ |
| Thickness | μm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Material from which it is made | | LSM |
| Thickness | μm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |

TABLE 1-continued

| Electrolysis cell | Unit | Value |
| --- | --- | --- |
| Tortuosity | | 4 |
| Current density | $A \cdot m^{-2}$ | 2000 |
| Electrolyte 3 | | |
| Material from which it is made | | YSZ |
| Thickness | μm | |
| Resistivity | Ω m | 0.42 |

All of the FIGS. 1 to 5 have already been commented on in the preamble. They are therefore not described below.

FIGS. 6A and 6B show an individual unit of an HTE electrolyzer according to the invention.

This unit firstly repeats all of the components, with their relative arrangements, of the unit according to FIGS. 4A and 4B according to the prior art.

The contact element 8 is here a nickel screen of the same surface area as the cathode 2.

According to the invention, a third seal 10 is provided in addition to the first seal 6 and second seal 7. This third seal 10 is inserted in the nickel screen 8, bears against the top interconnector 5.1 and the cathode 2 by being arranged at the periphery of the conduits for supplying steam 52, and for recovering the hydrogen produced 54, respectively.

The arrangement of the third seal 10 according to the invention thus delimiting the compartment 50 for distributing the steam supplied and the hydrogen produced which is restricted relative to the one from the prior art. Specifically, as shown by the arrows on the figures in FIGS. 4A and 4B, the steam is distributed uniformly and solely over the entire surface of the cathode 2. Thus, unlike the prior art, the steam is not distributed into non-active zones in the free space between the first seal 6 and the periphery of the cell, such as the zones Z1 from FIGS. 4A and 4B.

In order to produce the seal 10 according to the invention, a continuous bead of a glass-ceramic in the pasty state is deposited at ambient temperature on the surface of the nickel screen 8. Next, by passing beyond its glass transition temperature, between 850 and 1000° C., the paste melts and fills the meshes of the nickel screen 8 by conforming to the shape thereof. At the operating temperature of the electrolyzer, typically between 600 and 850° C., the glass-ceramic third seal 10 is crystallized.

The seal is deposited using a syringe and a deposition robot. The syringe pressure and the size of the needle are adjustable which makes it possible to obtain a deposited amount over a given time. The speed of advance of the arm of the robot is itself also adjustable. These parameters make it possible to meter the amount of glass/glass-ceramic deposited.

The temperature increase and decrease rates of the seal are preferably less than 5° C. min.

FIG. 7 illustrates the judicious positioning of the seal 10, the height of which is additionally well calibrated. As is seen, the third seal 10 is arranged in line with, i.e. in a vertical line with, the seal 7 under the electrolyte 3 at the periphery of the anode 4, and its height is substantially the same as that of the nickel screen 8. With these parameters, it may be seen that under clamping stresses represented in the form of arrows P, the stresses are uniformly distributed on either side of the cell which is not therefore subjected to tensile mechanical stresses that are detrimental thereto. Thus, only compressive stresses are applied uniformly on either side of the cell, these stresses being easily withstood by the cell.

FIG. 8 illustrates a configuration according to which the third seal 10 according to the invention is not positioned in an optimal manner. In this configuration, during the clamping, flexural displacements symbolized by the arrows F are applied to the cell. These flexural displacements give rise to detrimental tensions within the latter.

FIG. 9 illustrates a configuration according to which the seal 10 according to the invention has not been deposited with a suitable amount of glass-ceramic, which ultimately results in too high a height of the seal 10. It may be seen that in this configuration the clamping stresses P are not transmitted in full, or even are not transmitted at all to the nickel screen 8. Therefore, the mechanical contact between the top interconnector 5.1, the nickel screen 8 in the cathode 2 is not optimal, or even non-existent owing to an unoccupied zone Z2. Another risk is the overflowing of the glass-ceramic into the gas inlet and outlet channels.

On the contrary, in the case of too low a deposited amount of glass-ceramic, the nickel screen 8 may not be completely leaktight, which would have the consequence of reintroducing at least some of the steam into the zones Z1 as in the prior art.

FIG. 10 shows a concrete embodiment of a third seal 10 made of glass within and at the periphery of a nickel screen 8 intended to constitute a contact element between interconnector and cathode. The composition and the use of this glass seal 10 are as described in patent FR3014246 B1.

The inventors experimentally validated the effectiveness of a seal according to the invention.

They thus carried out comparative tests between a high-temperature electrolyzer according to the prior art and an electrolyzer according to the invention with exactly the same components arranged identically, the electrolyzer according to the invention being further provided with a glass seal 10 inserted in a nickel screen 8.

Each of the electrolyzers tested comprises a stack of 25 individual units with, for each cell, an active surface area of 100 cm².

The flow rates of steam sent to the inlet of electrolyzers are 10.8 Nml/min and per cm² of active surface area of the stack. Added to this steam is a hydrogen flow rate of 1.2 Nml/min/cm², also sent to the inlet.

The electrolyzers were tested at an operating temperature of 800° C. The two electrolyzers have excellent leaktightness and 100% of the gases sent to the inlet are recovered at the outlet.

FIG. 11 presents polarization curves respectively of the electrolyzer according to the prior art and according to the invention, which are subjected to an increasing current. The total voltage of the stack is then measured. From these polarization curves, it is possible to calculate the equivalent electrical resistance referred to as ASR (acronym for "area specific resistance").

It emerges from this FIG. 11 that the ASR values are identical for the two electrolyzers, with a value of 0.34 Ohm·cm², which shows that, in both cases, the electrical contacts are good. In other words, the seal 10 according to the invention does not disrupt the quality of the electrical contacts or the performance of the electrolyzer.

An electrolyzer consumes the steam sent and converts it into hydrogen. When a polarization curve is produced, the current increases continuously which consumes more and more steam. The rate of use of the steam sent therefore increases during the polarization. When the residual steam in the active zones decreases, then the voltage within the electrolyzer increases greatly. This great increase in the voltage over the polarization curve is a marker indicating that most of the steam present in the active zones has been consumed. This great increase in voltage is referred to as "concentration overvoltage". For the commercial electrochemical cells of the prior art, if the concentration overvoltages appear for values of less than 90% of the rate of steam use, it may be considered that a portion of the steam is not distributed in the active zones of the electrolyzer and that it is lost for the application.

FIG. 12 presents the rate of steam use over the polarization curve as a function of the measured voltage, this being for an electrolyzer according to the prior art and the one according to the invention which were considered in the previous test.

It emerges from this FIG. 12 that the electrolyzer according to the prior art has a good performance up to a rate of use of 45%. Then concentration overvoltages are visible since the voltage increases rapidly.

The electrolyzer according to the invention itself operates up to rates of use of at least 65% without the appearance of a concentration overvoltage. This tends to prove that the seal 10 according to the invention makes it possible to substantially improve the distribution of the gases within the stack. In this test, the rates of use greater than 65% were not tested. However, the increase of at least 20% in the maximum rate of use is already indicative of a marked improvement in the performance.

An additional test was carried out on another electrolyzer according to the invention with a single individual unit therefore provided with a single electrolysis cell having an active surface area of 100 cm².

The flow rates injected at the cell inlet are here 10.8 Nml/min/cm² of active surface area for the steam to which a hydrogen flow rate of 1.2 Nml/min/cm² is added. The test is also carried out at a temperature of 800° C.

It is observed that this single-unit electrolyzer is perfectly leaktight and 100% of the gases sent are recovered at the outlet.

FIG. 13 presents the change in voltage at the terminals of the electrolyzer over a polarization curve and is plotted as a function of the rate of use.

It emerges from this FIG. 13 that the rate of use increases during the test and the concentration overvoltages appear for values of the order of 95% of rate of steam use. This proves that all of the steam is used.

Following the tests carried out, it is therefore possible to conclude that the additional seal 10 according to the invention makes it possible to distribute the steam in an optimal manner in the active zones of the cells and that therefore, unlike the configurations according to the prior art, no amount of steam is sent into non-active zones of the electrolyzer, such as the zones Z1 from FIGS. 4A and 4B according to the prior art.

The invention is not limited to the aforementioned examples; in particular, features of the illustrated examples may be combined in variants that have not been illustrated.

Other variants and improvements may be envisaged within the context of the invention.

In particular, if the material inserted in the nickel screen 8 is a glass-ceramic in the examples described in detail above, it may be any material that opposes the passage of the gases and that may be readily shaped within a porous metallic substrate of a contact element. It may especially be a solder that seals the screen over its periphery, before or after its my placement within the stack.

Instead of a nickel screen, use may be made of other contact elements containing a porous substrate and that are electron conductors.

The invention claimed is:

1. A device, comprising:
   an individual solid oxide electrolysis cell comprising a cathode, an anode and an electrolyte inserted between the cathode and the anode,
   a first and a second electrical and fluid interconnector, each consisting of a component made of electron-conducting and gastight material, the first and second interconnectors being arranged on either side of the individual cell; the first interconnector being pierced with a steam supplying conduit for supplying steam, which opens at a periphery of one side of the cathode, and with a hydrogen recovery conduit for recovering hydrogen produced, which opens at a periphery of the cell on a side of the cathode opposite the side on which the steam supplying conduit opens, so as to distribute the steam supplied and the hydrogen produced, in a first compartment; the second interconnector being pierced with an oxygen recovery conduit for recovering oxygen produced, which opens at a periphery of the cell on a side of the anode so as to distribute the oxygen produced to the oxygen recovery conduit in a second compartment;
   a first electrical contact element, different from the interconnectors, which is in mechanical contact on the one hand with the first interconnector and on the other hand with the cathode; the first electrical contact element being a porous substrate;
   a first seal arranged at a periphery of the individual cell and bearing both against the first interconnector and against the second interconnector;
   a second seal arranged at a periphery of the anode of the individual cell and bearing both against the second interconnector and against the electrolyte; and
   a third seal, inserted in the porous substrate of the first contact element and bearing against the first interconnector and the cathode by being arranged at a periphery of the steam supplying conduit and hydrogen recovery conduit, respectively, thus delimiting the first compartment for distributing the steam supplied and the hydrogen produced.

2. The device of claim 1, wherein the second interconnector being is pierced with a draining gas suppling conduit for supplying draining gas on the cell on a side of the anode opposite the side on which the oxygen recovery conduit opens, so as to distribute respectively the draining gas supplied and the oxygen produced, from the draining gas supplying conduit to the oxygen recovery conduit.

3. The device of claim 1, further comprising a second electrical contact element, which is in mechanical contact on the one hand with the anode and on the other hand with the second interconnector.

4. The device of claim 1, wherein the third seal additionally is arranged substantially in a vertical line with the second seal, the first contact element being considered to be above the electrolyte.

5. The device of claim 1, wherein the third seal at the periphery of the conduits is a bead based on glass and/or glass-ceramic inserted into the porous substrate of the first contact element.

6. The device of claim 1, wherein the third seal at the periphery of the conduits consists of a bead based on a solder inserted into the porous substrate of the first contact element.

7. The device of claim 1, wherein the third seal at the periphery of the conduits has the same height as that of the porous substrate of the first contact element.

8. The device of claim 1, wherein the porous substrate of the first contact element is a metal screen.

9. The device of claim 1, wherein the porous substrate of the first electrical contact element has a surface area identical to that of the electrode with which it is in contact.

10. An HTE electrolysis or co-electrolysis reactor, comprising a stack of a plurality of devices of claim 1.

11. A system, comprising the HTE electrolysis or co-electrolysis reactor of claim 10, wherein the HTE electrolysis or co-electrolysis reactor is operable reversibly as a fuel cell.

12. A device, comprising:
an individual solid oxide electrochemical cell formed of an anode, a cathode and an electrolyte inserted between the cathode and the anode,
a first and a second electrical and fluid interconnector, each consisting of a component made of electronconducting and gastight material, the first and second interconnectors being arranged on either side of the individual cell; the first interconnector being pierced with a fuel supplying conduit for supplying fuel, which opens at a periphery of one side of the anode, and with a water recovery conduit for recovering water produced, which opens at a periphery of the cell on a side of the anode opposite the side on which the fuel supplying conduit opens, so as to distribute the fuel supplied and the water produced, respectively, in a first compartment; the second interconnector being pierced with an air or oxygen supplying conduit for supplying air or oxygen, which opens at a periphery of the cell on one side of the cathode and with an air or oxygen recovery conduit for recovering surplus air or oxygen, which opens at a periphery of the cell on a side of the cathode opposite the side on which the air or oxygen supplying conduit opens, so as to distribute the air or oxygen to the air or oxygen recovery conduit in a second compartment;
a first electrical contact element, different from the interconnectors, which is in mechanical contact on the one hand with the first interconnector and on the other hand with the anode; the first electrical contact element being a porous substrate;
a first seal arranged at the periphery of the individual cell and bearing both against the first interconnector and against the second interconnector;
a second seal arranged at the periphery of the cathode of the individual cell and bearing both against the second interconnector and against the electrolyte;
a third seal, inserted into the porous substrate of the first contact element and bearing against the first interconnector and the anode by being arranged at a periphery of the fuel supplying conduit and the water recovery conduit, respectively, thus delimiting the first compartment for distributing the fuel supplied and the water produced.

13. The device of claim 12, further comprising a second electrical contact element, which is in mechanical contact on the one hand with the cathode and on the other hand with the second interconnector.

14. A fuel cell, comprising a stack of a plurality of devices of claim 12.

15. A system, comprising the fuel cell of claim 14, wherein the fuel cell is operable reversibly as an HTE electrolysis or co-electrolysis reactor.

16. The device of claim 12, wherein the third seal additionally is arranged substantially in a vertical line with the second seal, the first contact element being considered to be above the electrolyte.

17. The device of claim 12, wherein the third seal at the periphery of the conduits is a bead based on glass and/or glass-ceramic inserted into the porous substrate of the first contact element.

18. The device of claim 12, wherein the third seal at the periphery of the conduits consists of a bead based on a solder inserted into the porous substrate of the first contact element.

19. The device of claim 12, wherein the third seal at the periphery of the conduits has the same height as that of the porous substrate of the first contact element.

20. The device of claim 12, wherein the porous substrate of the first contact element is a metal screen.

21. The device of claim 12, wherein the porous substrate of the first electrical contact element has a surface area identical to that of the electrode with which it is in contact.

22. An HTE electrolysis or co-electrolysis reactor, comprising a stack of a plurality of devices of claim 12.

* * * * *